United States Patent
Grabmaier et al.

[11] 3,730,607
[45] May 1, 1973

[54] INDICATOR SCREEN WITH CONTROLLED VOLTAGE TO MATRIX CROSSPOINTS THEREOF

[75] Inventors: Josef Grabmaier, Unterhaching; Hans Krueger, Munich; Ulrich Wolff, Munich, all of Germany

[73] Assignee: Siemens Aktiengesellschaft, Berlin & Munich, Germany

[22] Filed: July 12, 1971

[21] Appl. No.: 161,776

[30] Foreign Application Priority Data

July 23, 1970 Germany..................P 20 36 665.8

[52] U.S. Cl.............................................350/160 LC
[51] Int. Cl...................................................G02f 1/34
[58] Field of Search...................350/160 LC, 267

[56] References Cited

UNITED STATES PATENTS 3,322,485   5/1967   Williams.......................350/160 LC

*Primary Examiner*—Ronald L. Wibert
*Assistant Examiner*—V. P. McGraw
*Attorney*—Carlton Hill et al.

[57] ABSTRACT

This invention provides an indicator screen comprised of two vertically superimposed systems of parallel transparent conductor paths, a nematic liquid crystalline layer positioned between the two conductor systems, and an interrupted barrier-free layer of a non-linear resistor material arranged between one of the conductor systems and the liquid crystalline layer.

6 Claims, 6 Drawing Figures

INVENTORS
Josef Grabmaier
Hans Krueger
Ulrich Wolff

BY *Hill, Sherman, Meroni, Gross & Simpson* ATTYS.

3,730,607

INDICATOR SCREEN WITH CONTROLLED VOLTAGE TO MATRIX CROSSPOINTS THEREOF

BACKGROUND OF THE INVENTION

1. Field of the Invention

This invention relates to an indicator screen composed of two systems of parallel transparent conductor paths having interposed between them a nematic liquid crystalline layer and an interrupted barrier-free layer of a non-linear resistor material arranged between one of the conductor systems and the liquid crystalline layer.

2. Description of the Prior Art

A liquid crystalline material is generally in a liquid state but in contrast to ordinary liquids has certain crystalline properties. The liquid crystalline material may have one and in some cases several interphases varying between the firm crystalline state and the isotropic liquid state, e.g. smectic, nematic and chloesterinic mesophases.

Nematic crystalline liquids which have been used in conjunction with systems of conductor paths in a picture screen and the like, have a preferred alignment of their molecules along their longitudinal axis over a large range which is dependent upon the position or arrangement of the liquid crystalline material in the picture screen. The molecules can be aligned over even larger ranges with the assistance of magnetic and electrical fields of high voltages, e.g., 1,000 volts per centimeter. The voltage can be applied in such a manner that the optical axis of the molecules is parallel to its field axis. If an electric voltage is applied to a thin nematic liquid crystalline layer, a visible change of the optical properties of the layer will occur only when the electric field strength has reached a certain threshold value. When this threshold value is exceeded, the diffraction index of the nematic crystalline liquid becomes increasingly turbulent and the light which passes therethrough will become more strayed and diffused. The light-straying which is caused by the turbulence of nematic crystalline liquids is also referred to as "dynamic" light-straying. A plausible explanation of the dynamic light-straying is based on the so-called "swarm" theory. That is, the theory of the flight of several planes of molecules in formation. According to the "swarm" theory, the molecules of the nematic crystalline liquid gather in swarms of about $10^5$ molecules. The molecules lie parallel to one another within these swarms. The swarm thus obtains a permanent dipole moment. When an electric field is applied to the nematic crystalline liquid, the swarms align with their permanent dipole moment in the field direction. Due to the angle which is formed by the longitudinal axis of the molecules in the molecular dipole moment, the longitudinal axis of the molecules has a certain inclination with respect to the field direction. If during this swarming movement, ions were to be moved through such a molecule arrangement under the effect of an electric field, a shearing force would be exerted onto the individual volume elements which would tend to turn the longitudinal axis of the molecules in the direction of the ion flow. In this manner there results a steady interaction between the alignment of the dipoles under the effect of the electric field and the alignment of the molecules along their longitudinal axis according to the direction of movement of the ions. This interaction causes a dynamic anisotropy of the diffraction index and thus, the dynamic light-straying is caused as a final effect.

Because of the properties of the liquid crystals, a layer of a liquid crystal can be utilized as a picture screen whereby the liquid crystalline layer is moved differently into the straying state with the help of matrix-shaped electrodes. Such a picture screen can be used in conjunction with glass plates which would be arranged on both sides of the liquid crystalline layer and each of which have a system of parallel conductor paths respectively arranged on their inner sides. With this arrangement, the system of conductor paths of one glass plate stands vertically superimposed on the other system of conductor paths in the other glass plate. With this arrangement, if a voltage is applied to a vertical conductor path of one system and a horizontal conductor path of the other system, an electric field will be created at the cross point of such conductor paths and extend through the liquid crystalline layer. This extension of the electric field will change the current behavior of the illuminated liquid layer at a corresponding point therein and cause the layer to light up or glow at this corresponding point. However, there is a problem in this arrangement in that a similar though lesser light-straying is produced at the other cross points along the conductor paths and not only at the selected cross point.

In an attempt to eliminate this light-straying, a practice has been established whereby diodes are arranged between the liquid crystalline layer and the conductor paths of one of the conductor path systems. The cost, however, for constructing such a screen is excessive since a diode has to be provided for each matrix cross point. The cost of producing this diode matrix is greater than that of all of the remaining elements of the liquid-crystalline picture screen.

Accordingly, it is the primary object of the present invention to provide a practical and economical means for producing a picture or indicator screen where the straying of light in response to an electrical charge, to various electric cross points of the liquid matrix of the indicator or picture screen is eliminated.

Another object of the present invention is to provide a simple method of producing a liquid crystalline indicator or picture screen where the light does not stray over the various cross points of its liquid crystalline matrix.

SUMMARY OF THE INVENTION

The present invention provides an indicator screen which overcomes the disadvantages of the prior art structures. The indicator screen of the present invention includes two vertically superimposed systems of parallel conductor paths, a nematic liquid crystalline layer interposed between them, and an interrupted barrier-free layer of a non-linear resistor material arranged between one of the conductor path systems and the liquid crystalline layer. The non-linear resistant material consists of an oxide layer, for example, an aluminum oxide layer. With such a layer of non-linear resistor material, the problem of light straying upon a voltage application to the various cross point of the conductor paths is eliminated.

Other objects, features and advantages of the present invention will be readily apparent from the following description of certain preferred embodiments thereof taken in conjunction with the accompanying drawings although variations and modifications may be effected without departing from the spirit and scope of the novel concept of the disclosure.

DESCRIPTION OF THE PREFERRED EMBODIMENTS

Figure 1:
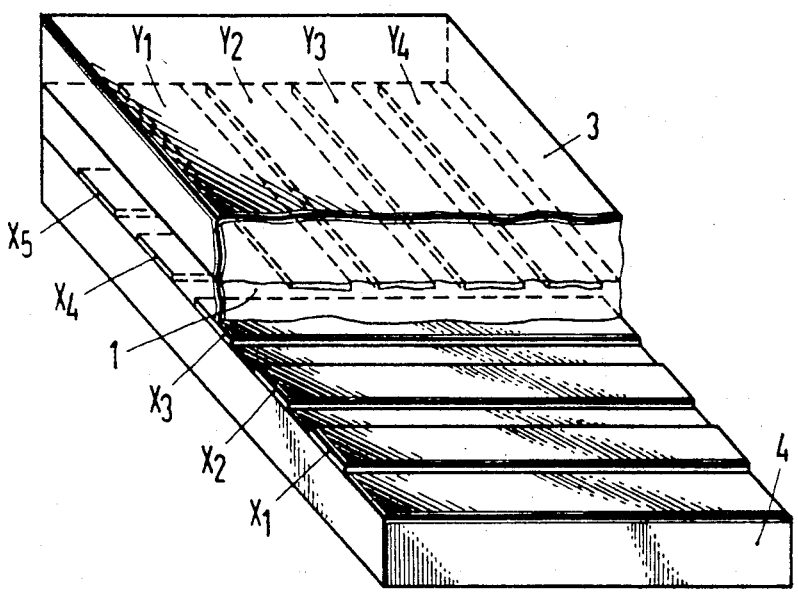
FIG. 1 is a partial schematic view of a conventional picture screen having a liquid crystalline layer.

In FIG. 1, a partial schematic view is provided of the construction of a conventional picture screen matrix with a liquid crystalline layer. The liquid crystalline layer 1 is arranged between two parallel glass plates 3 and 4. Each glass plate has arranged therein a system of parallel electrically-conductive transparent webs. Plate 3 has arranged therein a series of transparent webs $Y_1$, $Y_2$, $Y_3$ and $Y_4$; and plate 4 a series of transparent webs $X_1$, $X_2$, $X_3$, $X_4$ and $X_5$. The electrically-conductive webs may be made of any suitable conductive material such as tin oxide.

Figure 2:
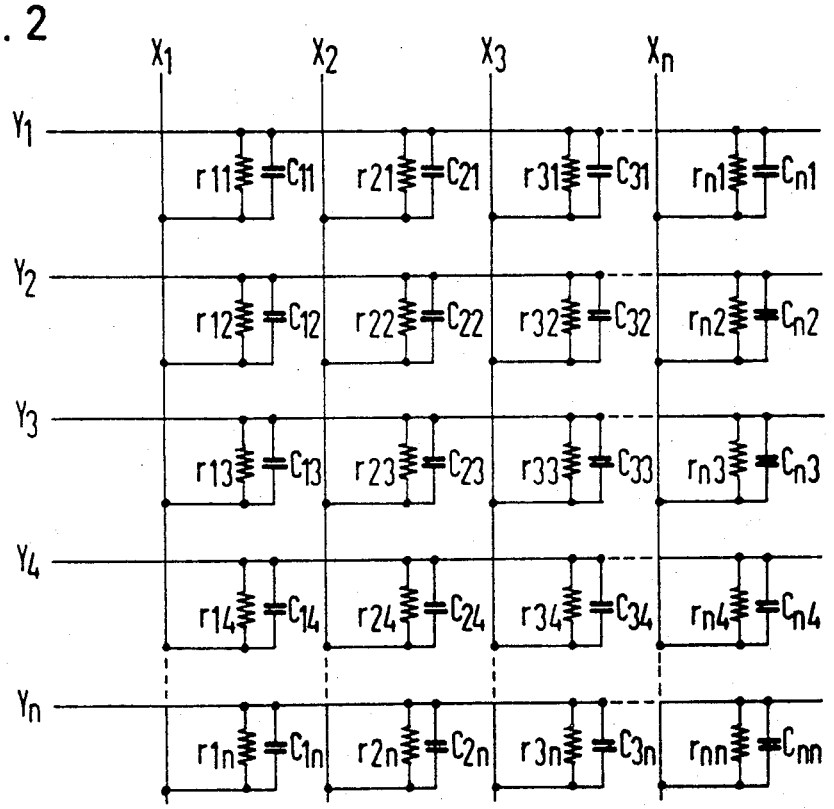
FIG. 2 illustrates a substitute circuit diagram of the picture screen shown in FIG. 1.

FIG. 2 shows a substitute circuit diagram of the picture screen matrix construction shown in FIG. 1. In the circuit diagram there is shown both the capacities which are illustrated in the form of concentrated capacities indicated by $C_{11}$, $C_{12}$, ... $C_{n1}$ and through $C_{nn}$, and a galvanic coupling illustrated in the form of coupling resistances indicated by $r_{11}$, $r_{12}$, ... $r_{n1}$ and through $r_{nn}$. Both the capacities and coupling resistances are due to the conductivity of the crystalline liquid even though it may be small. If, for example, a voltage is applied to the conductor paths $X_2$ and $Y_2$, the cross point of these two conductor paths would be energized with the voltage intensity developed at this cross point. This voltage intensity would cause the corresponding cross point on the picture screen to light up or glow. All of the remaining cross points along the respective conductor paths $Y_2$ and $X_2$ would also receive approximately half of the voltage of that received by the cross point of $X_2$ and $Y_2$ and thus showing a light-straying effect even if it is a weaker and lesser one. As can be seen from the illustrated circuit diagram, a current flow will occur, for instance, by way of the resistances and capacities, i.e. $r_{12}$, $C_{12}$; $r_{11}$; $C_{11}$; and $r_{21}$, $C_{21}$; when the lines $X_2$ and $Y_2$ are energized with the exception of the cross point of lines $X_2$ and $Y_2$. Similar current flows occur at the remaining cross points.

It can readily be seen when considering the series and parallel connections of the capacities and/or resistances which are provided by the matrix that voltages occur at the cross points $X_2$, $Y_1$; $X_2$, $Y_3$; $X_2$, $Y_4$; and $X_2$, $Y_n$ as well as at cross points $X_1$, $Y_2$; $X_3$, $Y_2$; and $X_n$, $Y_2$. And, as indicated, these voltages may be half as large as the voltage at the selected cross point of $X_2$ and $Y_2$. Theoretically, the half value of energizing voltage is obtained with an infinitely large matrix. The energizing voltage will, accordingly, become lower with a matrix having a correspondingly lesser number of X and Y lines.

Figure 3:
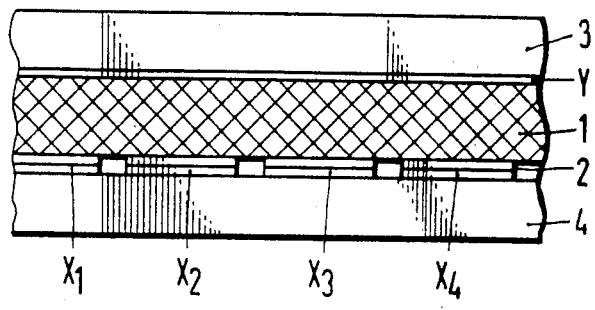
FIG. 3 is a partial sectional view of an indicator; screen according to the present invention illustrating an interrupted barrier-free layer of a non-linear resistor material arranged inbetween a liquid crystalline layer and a corresponding conductor path system.

FIG. 3 shows a partial section of the matrix of an indicator screen construction according to the present invention. In this screen construction, an interrupted barrier-free layer 2 of a non-linear resistor material is arranged between one of the conductor systems, i.e. the system having transparent conductor webs $X_1$ ... $X_4$, and the nematic liquid crystalline layer 1. As can be seen in FIG. 3, the interrupted layer 2 is placed directly over the individual conductive transparent webs $X_1$, $X_2$, $X_3$ and $X_4$ of the conductive system arranged in the glass plate 4. Such an arrangement provides a greater resistance of the voltage that may be applied to the indicator screen matrix.

Figure 4:
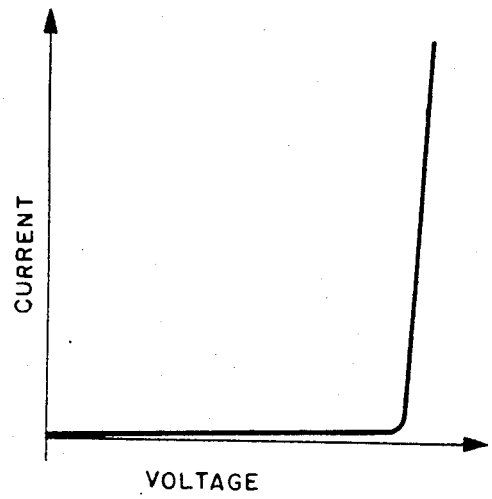
FIG. 4 is a graph illustrating the current voltage characteristic of the interrupted barrier-free layer of non-linear resistor material shown in FIG. 3.

In FIG. 4, a graph illustrates the current voltage characteristic of the non-linear resistant material of layer 2 shown in FIG. 3. According to the present invention, when voltages are applied to the conductor paths of the indicator screen matrix construction shown in FIG. 3 (and illustrated by the circuit diagram in FIG. 5) in such a manner that the energizing voltage not only occurs at the intended and selected cross point but also in amounts of one-third of this energizing voltage at the remaining cross points, the energizing of the cross points other than the selected cross point can be avoided by the layer of non-linear resistor material 2 arranged between the conductor system and liquid layer 1. This is because of the non-linear characteristics of the resistor material of layer 2 which elements are illustrated in the circuit diagram of FIG. 5 as resistor elements $R_{11}$, $R_{21}$, ... $R_{43}$.

Figure 5:
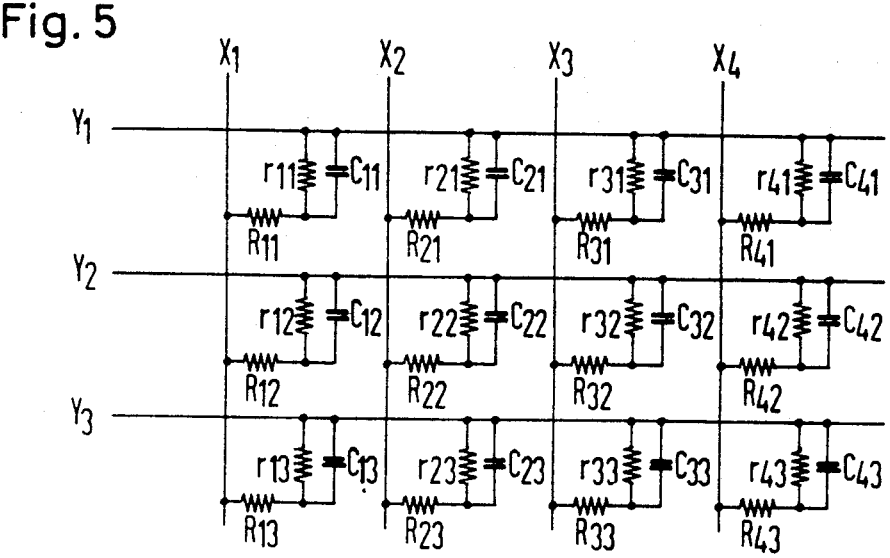
FIG. 5 illustrates a substitute circuit diagram of the indicator screen of which a partial sectional view is shown in FIG. 3.

Referring to the circuit diagram shown in FIG. 5, voltage may be applied to the conductor path $X_2$ while no voltage is applied to the conductor path $Y_2$ and only one-third of the energizing voltage applied to $X_2$ is applied to the non-selected conductor paths $X_1$, $X_3$ and $X_4$ as well as the non-selected conductor paths $Y_1$ and $Y_3$. With this arrangement, by measuring the energizing voltage, the current-voltage characteristic of the non-linear resistor material, and the threshold voltage of the liquid crystalline layer 1 in a suitable manner, a light-straying effect or glowing effect can be obtained by application of the full energizing voltage at a selected cross point but not with the application of one-third of the energizing voltage at the other non-selected cross points.

Various non-linear resistor materials may be utilized according to the present invention, however, aluminum oxide and tantalum oxide have proven to be effective non-linear resistor materials in the present invention. Also, a cadmium selenide layer may be utilized as the resistor material 2.

Figure 6:
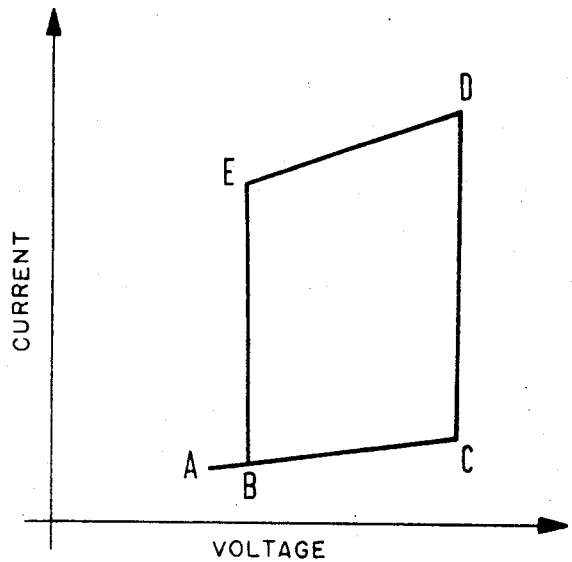
FIG. 6 is a graph illustrating the current voltage characteristic of an interrupted barrier-free layer of a bistable non-linear resistor material.

As illustrated in FIG. 6 by the current-voltage characteristic of a bistable resistor material, the use of a bistable layer in the present invention has proven to be quite advantageous. Such a current-voltage characteristic is shown, for example, by a cadmium selenide layer. As indicated in the graph of FIG. 6, if a liquid crystalline layer is in contact or connected in series with a bistable layer, a low current will flow through the matrix only until a voltage is applied to the bistable layer that exceeds a certain threshold voltage. As shown in FIG. 6, where a low voltage is applied as at the level shown by point "A", the conductivity of the bistable layer remains low and constant. However, if the voltage applied to the bistable element exceeds the certain threshold voltage corresponding to point "C" in FIG. 6, the conductivity of the layer increases suddenly to a level indicated by point "D", i.e. greater than 1,000 times, and the liquid crystalline layer is energized. The liquid crystalline layer 2 remains energized until the applied voltage drops to a value represented by the point "E" at which value, and point, the conductivity of the layer rapidly decreases to a low value as indicated by point "B".

It is preferred that a liquid crystalline matrix as provided by the present invention have a layer of a bistable material such as cadmium selenide, inbetween the liquid crystalline layer and one of the conductor systems. With a layer of a bistable material present in the matrix, a positive initial voltage is applied to all Y conductor paths, i.e., $Y_1$, $Y_2$, etc., and a corresponding negative initial voltage is applied to all X conductor paths, i.e., $X_1$, $X_2$, etc. and the energizing of the desired cross point is effected in such a way that a corresponding impulse is applied to the selected conductor paths. Accordingly, the voltage which is applied to the selected cross point is increased to a level that exceeds the threshold value corresponding to point "C", in FIG. 6, whereby the liquid crystalline layer at a location corresponding to the cross point is transformed into a state of dynamic light-straying.

It is noted that with this arrangement it would be possible to construct a picture storer by providing a layer of a bistable current voltage material such as cadmium selenide in a liquid crystalline matrix provided by the present invention. It is also noted that by including a bistable material such as cadmium selenide in the liquid crystalline matrix that the selectivity of energizing a particular cross point or area of the matrix is most easily achieved.

Although minor modifications may be suggested by those versed in the art, it should be understood that we wish to embody within the scope of the patent warranted hereon all such modifications as reasonably and properly come within the scope of our contribution to the art.

We claim as our invention:

1. An indicator screen comprising two vertically superimposed systems of parallel transparent conductor paths, a nematic liquid crystalline layer interposed between the two conductor systems, and an interrupted barrier-free layer of a non-linear resistor material arranged between one of the conductor systems and the liquid crystalline layer, said resistor material having a high resistance where the voltage applied to the conductor paths is less than the threshold voltage of the liquid crystalline layer and a low resistance where the voltage applied to the conductor paths is greater than the threshold voltage of the liquid crystalline layer.

2. An indicator screen according to claim 1, wherein the non-linear resistor layer is only attached to the conductor paths of the conductor system.

3. An indicator screen according to claim 1, wherein the non-linear resistor material consists of an oxide layer.

4. An indicator screen according to claim 3, wherein the oxide layer consists of aluminum oxide.

5. An indicator screen according to claim 3, wherein the oxide layer consists of tantalum oxide.

6. An indicator screen according to claim 3, wherein the oxide layer consists of cadmium selenide.

* * * * *